W. H. CUSHING.
SANITARY RAT TRAP.
APPLICATION FILED FEB. 21, 1917.
1,226,641.
Patented May 22, 1917.
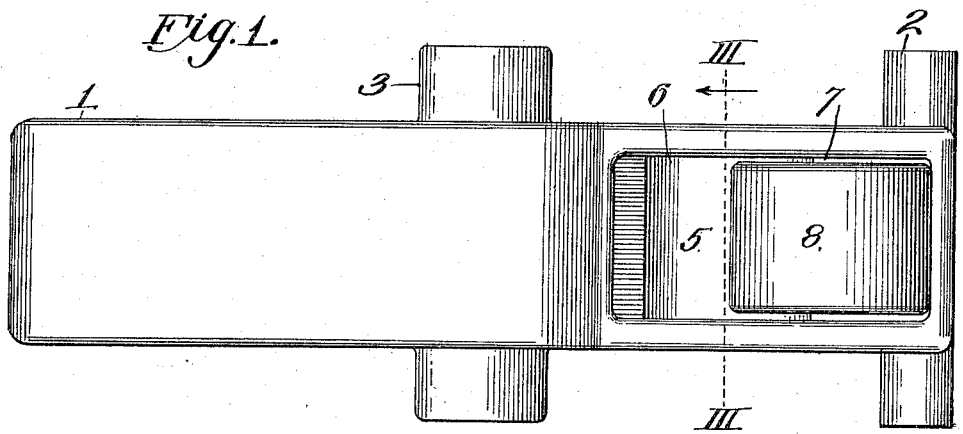
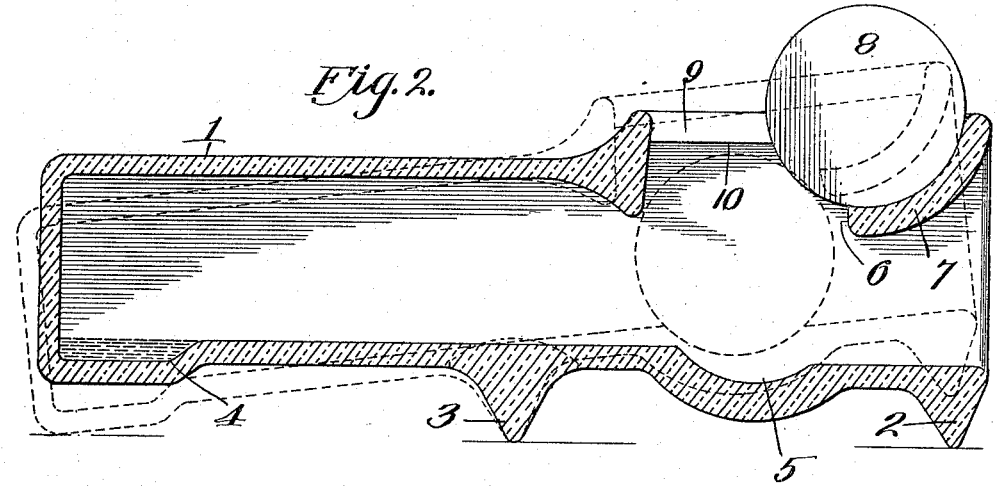
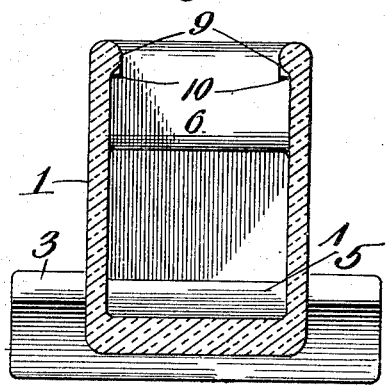
Inventor
W. H. Cushing

UNITED STATES PATENT OFFICE.

WILLIAM H. CUSHING, OF TOPEKA, KANSAS, ASSIGNOR OF ONE-HALF TO CHARLES E. GAULT, OF TOPEKA, KANSAS.

SANITARY RAT-TRAP.

1,226,641.         Specification of Letters Patent.         Patented May 22, 1917.

Application filed February 21, 1917. Serial No. 150,601.

*To all whom it may concern:*

Be it known that I, WILLIAM H. CUSHING, a citizen of the United States, residing at Topeka, in the county of Shawnee and State of Kansas, have invented certain new and useful Improvements in Sanitary Rat-Traps, of which the following is a specification.

This invention relates to traps for rodents and more especially for catching rats and mice, and my object is to produce a trap which is efficient in operation and which is of material which cannot absorb or become impregnated or permeated with the odor of rodents which have been caught in the trap, as rats and mice will not readily enter a trap to which such odor clings.

A further object is to produce a glass or porcelain trap of simple and cheap construction which can be thoroughly cleansed and made odorless by washing or scalding in hot water.

A further object is to produce a tiltable trap open at one end and having an opening in its upper wall adjacent the said open or front end, and a door adapted when the trap tilts downward at its closed end, to simultaneously close the said open end and the said top wall opening to the escape of an animal trapped between said door and the closed end of the trap.

Another object is to produce a trap of such construction that the trapped rodent cannot overturn it in struggling to escape nor raise the door from its closed position.

More especially my object is to produce a trap of glass, porcelain or the like which is closed at one end and provided thereat with a chamber for the reception of fresh milk or other bait attractive to rats or mice, and which is so proportioned that by the time the rodent attains a position giving access to the bait, the trap is overbalanced and tilts downward at the baited end and thereby instantly causes a door to drop down into the trap behind the animal and cut off escape from the trap.

With these objects in view the invention consists in certain novel and peculiar features of construction and organization of parts as hereinafter described and claimed; and in order that it may be fully understood reference is to be had to the accompanying drawing, in which:

Figure 1, is a top plan view of a rodent trap embodying my invention.

Fig. 2, is a central vertical longitudinal section of the same, and shows in dotted lines, the position assumed by the trap when the same is overbalanced by a trapped animal.

Fig. 3, is a cross section taken on the line III—III of Fig. 1.

In the said drawing 1 indicates a hollow trap of glass or the like, provided with integrally formed depending legs 2 and 3, the former being at the front end and the latter at an intermediate point in the length of the trap; and the leg 3 is V-shaped in cross section so that it shall constitute a fulcrum upon which the trap is adapted to tilt, when the trap is overbalanced through the weight of a trapped animal, as hereinafter more particularly referred to.

The bottom wall of the trap is provided at its closed end with a depression to form a milk or other bait receiving chamber 4, and between the legs 2 and 3 the bottom wall is provided with a segmental recess 5.

Vertically above the recess 5 the trap is formed with an opening 6 in its top wall, and said wall forward of said opening curves as at 7, downward and rearward from the front extremity of the trap in a plane substantially below that of the upper edges of the side walls, to the rear side of said opening. It will be noted by reference to Fig. 2, that the arcuate or curved portion 7 is of such extent that it curves upward slightly at its rear end, so that a cylindrical trap door 8, fitting between the side walls and resting on said arcuate portion cannot roll off the support unless the trap is tilted, but shall roll rearward off the arcuate portion of the wall and drop down through the opening 6, the instant the trap is tilted by the weight of an animal which has entered the trap far enough to reach the bait in chamber 4. It will be understood that the trap will be of such proportion that the animal must pass opening 6 before obtaining access to the bait, and that the door 5 is of such proportion that when it drops into the recess 5 it shall not only close the passage of the trap but shall project upward a sufficient distance into opening 6 to close the same against the escape of the animal through said opening, it being desirable however, that the parts shall be so proportioned that there shall be a slight space between the lower edge of the rear wall of opening 6 and the door to induce the rodent to attempt to escape at such point and thereby through its own efforts hold the door in closed position.

In this connection it will be observed that the trap can be made narrow, provided the legs 2 and 3 project a sufficient distance beyond the sides to guard against the possibility of the trap being turned on its side through the struggles of the animal, as should this occur it would be possible for the door to be shoved outward laterally through the opening 6 and thus permit the animal to escape. To guard against this contingency however, the side walls at their upper edges are flanged inward at 9 to form shoulders 10 against the undermost of which, should the trap be lying on its side, the door would be apt to lodge if shoved laterally in the opening 6 by the trapped rodent.

It will also be noted that recess 5 receives so much of the lower portion of the door when in its closed position, that the animal can obtain no leverage to lift the door in struggling to pass under it, as would be the case if the cylindrical door should rest upon a flat surface.

It will be understood of course that the trap may be made of circular form in cross section, instead of substantially rectangular as shown, and that other changes of form may be resorted to without departing from the principle of construction involved or the spirit and scope of the appended claims.

It will of course be obvious that after an animal has been caught and disposed of, the trap can be quickly, easily and thoroughly cleansed by scalding it, and that after it is rebaited, it can be made instantly ready for further service, it being observed in this connection that the side walls which rise above the arcuate portion, guard against any possibility of the door being dislodged accidentally through the appliance of lateral pressure against it.

I claim:

1. A hollow tilting trap, open at one end and closed at the other, and provided near its open end with an opening in its top wall, and a door supported upon the top wall and adapted to coöperate with the end of the trap forward of the tilting point thereof, in holding the rear end of the trap elevated, and to be dislodged when said end is depressed, and fall through the opening in the top wall and close the trap to the escape of an animal trapped between said closed door and the closed end of the trap.

2. A hollow tilting trap of tubular form and closed at one end and provided near its other end with an opening in the top wall; said trap having a depending foot at its front end and a depending fulcrum foot at a point rearward of the plane of the said opening in the top wall, and a door resting on the top wall forward of the opening thereof and coöperating in holding the rear end of the trap in elevated position; said door when the closed end of the trap is depressed falling through said opening and closing the trap to escape therefrom of an animal between said door and the closed end of the trap.

3. A hollow tilting trap, open at one end and closed at the other, and provided near its open end with an opening in its top wall, the latter forward of said opening being of arcuate form, a cylindrical door resting upon said arcuate portion of the top wall and coöperating in holding the rear end of the trap elevated; said trap having a depending fulcrum upon which the trap tilts when the weight forward of such fulcrum point, is overbalanced.

4. A hollow trap, comprising a tubular portion closed at one end and open at the other and provided forward of its tilting point with an opening in its top wall and a recess in its bottom wall, the latter being vertically below the former, and a trap door to rest upon the top wall forward of said opening and to roll rearward and fall through said opening into said recess when the front end of the trap is overbalanced by a preponderating weight rearward of the fulcrum point.

In testimony whereof, I affix my signature.

WILLIAM H. CUSHING.